(12) United States Patent
Zhang

(10) Patent No.: US 9,990,054 B2
(45) Date of Patent: Jun. 5, 2018

(54) CONTROL PANEL AND CONTROLLING METHOD THEREOF

(71) Applicant: Enno Electronics Co., Ltd., Chengdu (CN)

(72) Inventor: Genyuan Zhang, Chengdu (CN)

(73) Assignee: Enno Electronics Co., Ltd, Chengdu (CN)

(*) Notice: Subject to any disclaimer, the term of this patent is extended or adjusted under 35 U.S.C. 154(b) by 12 days.

(21) Appl. No.: 15/089,458

(22) Filed: Apr. 1, 2016

(65) Prior Publication Data
US 2017/0168590 A1 Jun. 15, 2017

(30) Foreign Application Priority Data
Dec. 15, 2015 (CN) .......................... 2015 1 0936995

(51) Int. Cl.
G06F 3/023 (2006.01)
G06F 3/0482 (2013.01)
G06F 3/0488 (2013.01)

(52) U.S. Cl.
CPC .......... *G06F 3/0238* (2013.01); *G06F 3/0482* (2013.01); *G06F 3/04886* (2013.01)

(58) Field of Classification Search
None
See application file for complete search history.

(56) References Cited

U.S. PATENT DOCUMENTS

| | | | |
|---|---|---|---|
| 2003/0234652 A1 | 12/2003 | Bald | |
| 2008/0129685 A1* | 6/2008 | Bertolus | G06F 3/03547 345/156 |
| 2012/0056817 A1* | 3/2012 | Griffin | G06F 3/0482 345/173 |
| 2017/0123644 A1* | 5/2017 | Ren | G06F 3/0482 |

FOREIGN PATENT DOCUMENTS

| | | |
|---|---|---|
| CN | 1416265 A | 5/2003 |
| CN | 1845039 A | 10/2006 |
| CN | 103164143 A | 6/2013 |
| CN | 104110791 A | 10/2014 |
| CN | 105093991 A | 11/2015 |
| CN | 205283513 U | 6/2016 |
| DE | 29816392 U1 | 12/1998 |
| EP | 1473610 A1 | 11/2004 |

* cited by examiner

*Primary Examiner* — Nicholas J Lee
*Assistant Examiner* — Duane N Taylor, Jr.
(74) *Attorney, Agent, or Firm* — Ude Lu; Cozen O'Connor

(57) ABSTRACT

A control panel and a controlling method thereof are provided. The control panel comprises: a panel body; a display screen provided on the panel body; at least four press buttons provided on the panel body, wherein each of the press buttons corresponds to a plurality of function electric circuits, and the connection relation between each of the press buttons and the plurality of function electric circuits corresponding thereto is determined according to a state of the display screen; the function electric circuits, each corresponding to at least one of the press buttons, for outputting the respective function information to a controller when at least one of the press buttons connected performs a touch control operation; and the controller, connected with the plurality of function electric circuits, for performing respective function operation(s) according to the received function information.

6 Claims, 3 Drawing Sheets

CONTROL PANEL AND CONTROLLING METHOD THEREOF

CROSS REFERENCE TO RELATED APPLICATIONS

This application claims benefit from Chinese Patent Application No. 201510936995.7, filed Dec. 15, 2015, the entire disclosure of which is incorporated by reference herein.

FIELD

This disclosure herein generally relates to a technical field of intelligent home controlling, and specifically to a control panel and a controlling method thereof.

BACKGROUND

With the continuous improvement and development of the science and technology, the intelligent home technology has become a necessary part of the family life. The intelligent controlling of the home devices is generally achieved by a control panel. The prior control panel generally includes a panel body, a plurality of press buttons on the panel body, with each press button having a respective function. Referring to FIG. 1, the panel body comprises 8 press buttons, with each press button having a respective function, as shown in FIG. 1. The user can, according to his/her own requirement(s), perform a touch control operation to the respective press button(s) on the panel body for achieving the respective function(s). However, if it is required to extend further function(s) of the control panel, it may be necessary to add press button(s) for respective function(s) onto the panel. In this case, the area of the panel body has to meet the need for respective number of the press button(s), thus increasing the cost of the control panel.

SUMMARY

In the embodiments of the disclosure, a control panel and a controlling method thereof are provided to enable more functions with relatively small number of press buttons.

In an embodiment of the disclosure, a control panel is provided, comprising:

a panel body;

a display screen provided on the panel body;

at least four press buttons provided on the panel body, wherein each of the press buttons corresponds to a plurality of function electric circuits, and the connection relation between each of the press buttons and the plurality of function electric circuits corresponding thereto is determined according to a state of the display screen;

the function electric circuits, each corresponding to at least one of the press buttons, for outputting the respective function information to a controller when at least one of the press buttons connected performs a touch control operation; and the controller, connected with the plurality of function electric circuits, for performing respective function operation(s) according to the received function information.

Preferably, when the display screen is in a closed state, the connection relation of each of the press buttons comprises the function electric circuit(s) in connection corresponding thereto, for outputting different function(s) according to different touch control manners of one or more of the press buttons connected with the function electric circuit(s); wherein the touch control manners comprise one or more of a duration of a touch control operation of the press button, times of successive touch control operations of the press button, and an order of touch control operations of the press buttons.

Preferably, when the display screen is in an open state, the display screen is used for showing a plurality of menu options sent by the controller, wherein different menu options are used for achieving different functions;

the control panel comprises four press buttons, wherein a first function electric circuit, connected with a first press button of the four press buttons, is used for outputting a Going-back function to the controller;

a second function electric circuit, connected with a second press button of the four press buttons, is used for outputting a Selecting function to the controller;

a third function electric circuit, connected with a third press button of the four press buttons, is used for outputting a Switching-up function to the controller;

a fourth function electric circuit, connected with a fourth press button of the four press buttons, is used for outputting a Switching-down function to the controller; and the controller, connected with the display screen, is further used for sending the plurality of menu options to the display screen and for achieving the Going-back, Switching and Selecting functions to the menu options in the display screen according to the function information output by the first, second, third and fourth function electric circuits.

Preferably, the four function electric circuits connected with the four press buttons comprised in the control panel comprise: an SR2014A chip; each of the four press buttons is connected to a press button port of the SR2014A chip, and the press button port connected with the press button accordingly corresponds to a press button outlet connected with the controller.

Preferably, the press button comprises a touching type press button.

In an embodiment of the disclosure, a controlling method of any one of the above-described control panels is provided, comprising:

judging the current state of the display screen, and according to the judging result, determining the connection relation between each of the press buttons and the plurality of function electric circuits corresponding thereto;

when it is detected that one or more of the at least four press buttons perform a touch control operation, the function electric circuit(s), connected with the press button(s) performing the touch control operation(s), sending the function information corresponding to the press button(s) performing the touch control operation(s) to the controller; and the controller, according to the received function information, performing respective function operation(s).

Preferably, when the judging result shows that the display screen is in the closed state, the function information corresponding to the press button(s) performing the touch control operation(s) comprises: different functions corresponding to different touch control manners of one or more of the press buttons performing the touch control operations; wherein the touch control manners comprise one or more of a duration of a touch control operation of the press button, times of successive touch control operations of the press button, and a order of touch control operations of the press buttons.

Preferably, when the judging result shows that the display screen is in the open state, the controlling method comprises: controlling the display screen, by the controller, to display a plurality of menu options, wherein different menu options are used for achieving different functions; and the function information corresponding to the press button(s) performing the touch control operation(s) comprises: a Going-back function, a Selecting function, a Switching-up function and a Switching-down function.

In the embodiment(s) of the disclosure, a control panel and a controlling method thereof are provided. It may be configured that at least four press buttons are provided on the panel body, wherein each of the press buttons corresponds to a plurality of function electric circuits, and the connection relation between each of the press buttons and the plurality of function electric circuits corresponding thereto is determined according to a state of the display screen. The function electric circuit(s) connected with at least one of the press buttons performing the touch control operation(s) may output respective function information to the controller such that the controller can perform the respective controlling operation(s). In the control panel, each press button may correspond to a plurality of function electric circuits and each function electric circuit may correspond to at least one of the press buttons. Therefore, if it is required to add function(s) of the control panel, more functions can be achieved by means of the at least four press buttons, without adding further press button(s) onto the panel body, thus decreasing the cost of the control panel.

DETAILED DESCRIPTION

Hereinafter, the technical solutions according to the embodiments of the disclosure will be described clearly and completely in combination with the accompanying drawings of the embodiments of the disclosure. It is understandable that the described embodiments are only some embodiments of the disclosure, rather than all embodiments thereof. Based on the embodiments of the disclosure, all other embodiments obtained by those skilled in the art without any inventive work will fall in the protection scope of the disclosure.

Figure 1:
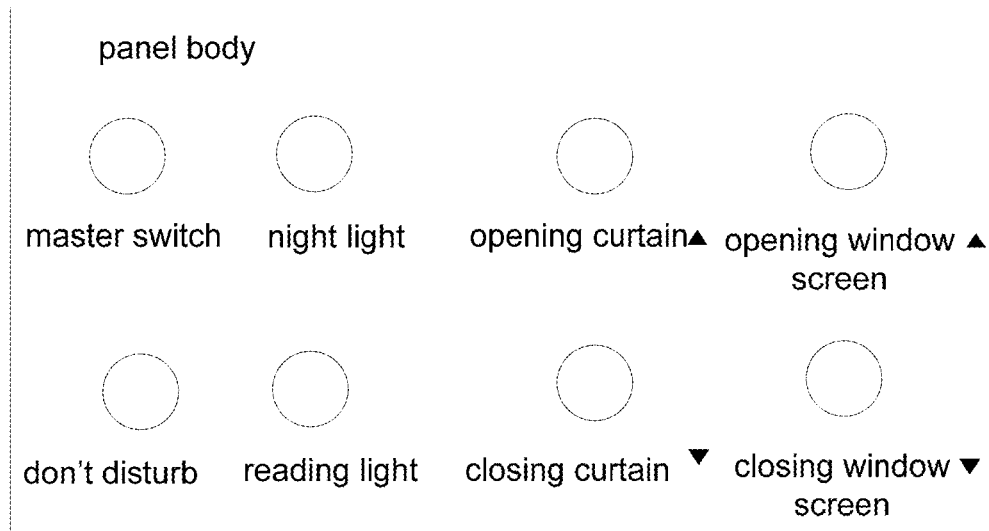
FIG. 1 is a structural schematic diagram of a control panel of the prior art.
Figure 2:
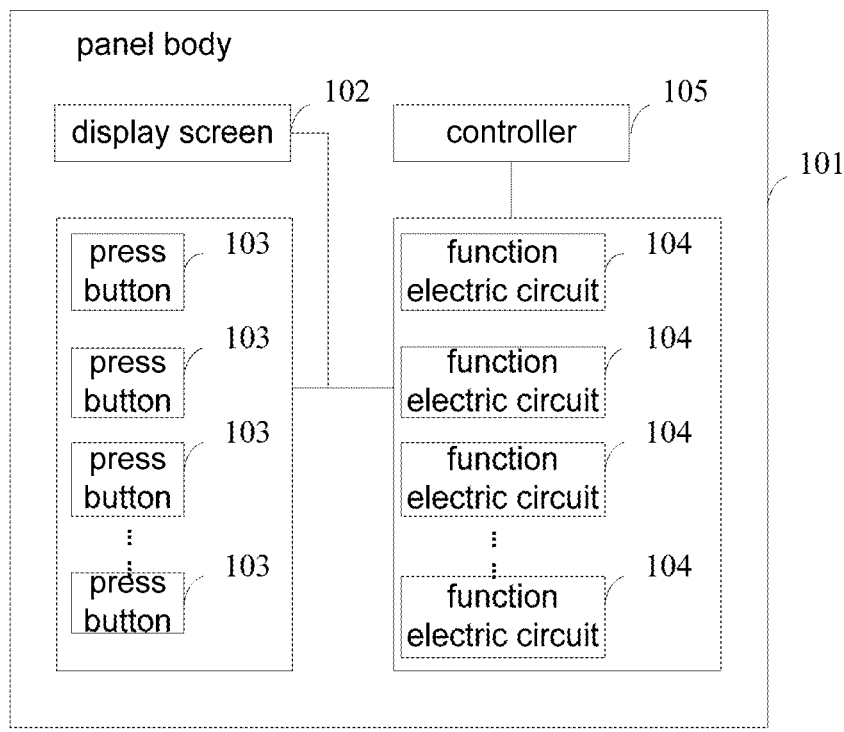
FIG. 2 is a structural schematic diagram of a control panel according to an embodiment of the disclosure.

As shown in FIG. 2, in an embodiment of the disclosure, a control panel is provided which may comprise:
a panel body 101;
a display screen 102 provided on the panel body 101;
at least four press buttons 103 provided on the panel body 101, wherein each of the press buttons 103 corresponds to a plurality of function electric circuits 104, and the connection relation between each of the press buttons 103 and the plurality of function electric circuits 104 corresponding thereto is determined according to a state of the display screen 102;

the function electric circuits 104, each corresponding to at least one of the press buttons 103, for outputting the respective function information to a controller 105 when at least one of the press buttons 103 connected performs a touch control operation; and the controller 105, connected with the plurality of function electric circuits 104, for performing respective function operation(s) according to the received function information.

In the control panel according to an embodiment of the disclosure, at least four press buttons are provided on the panel body, wherein each of the press buttons corresponds to a plurality of function electric circuits, and the connection relation between each of the press buttons and the plurality of function electric circuits corresponding thereto is determined according to a state of the display screen. The function electric circuit(s) connected with at least one of the press buttons performing the touch control operation(s) may output respective function information to the controller such that the controller can perform the respective controlling operation(s). In the control panel, each press button may correspond to a plurality of function electric circuits and each function electric circuit may correspond to at least one of the press buttons. Therefore, if it is required to add function(s) of the control panel, more functions can be achieved by means of the at least four press buttons, without adding further press button(s) onto the panel body, thus decreasing the cost of the control panel.

In the embodiment(s), the controlling function achieved by means of the control panel may include, but not be limited to, the following functions:
1. luminance controlling for light of different rooms;
2. controlling for opening or closing or stopping of the curtains;
3. controlling for KNX devices connected to the KNX bus, for enabling functions such as cooling by air conditioning or moisture maintenance, for example;
4. controlling for wireless WiFi and EnOcean, such as WiFi matching, EnOcean device adding, for example;
5. controlling for backlight, such as backlight luminance, effect(s), for example.

In an embodiment, the controlling function of the control panel according to the embodiment(s) of the disclosure may be achieved in two manners according to different states of the display screen 102. The states of the display screen 102 may comprise an open state and a closed state.

In the control panel, each of the press buttons 103 may correspond to a plurality of function electric circuits 104, and the connection relation between each of the press buttons and the plurality of function electric circuits 104 corresponding thereto may be determined according to a state of the display screen 102. For example, a first press button on the panel body 101 may correspond to three function electric circuits 104 including the first, second and third function electric circuits. The first function electric circuit may be used to connect to the first press button when the state of the display screen 102 corresponds to the open state. The second and third function electric circuits may be used to connect to the first press button when the state of the display screen 102 corresponds to the closed state.

In a preferred embodiment of the disclosure, when the display screen 102 is in a closed state, the controlling function of the control panel may be achieved in the following manner:

the connection relation of each of the press buttons 103 comprises the function electric circuit(s) 104 in connection corresponding thereto, for outputting different function(s) according to different touch control manners of one or more of the press buttons connected with the function electric circuit(s); wherein the touch control manners comprise one or more of a duration of a touch control operation of the press button, times of successive touch control operations of the press button, and an order of touch control operations of the press buttons.

Hereinafter, an example is provided in which the control panel comprises four press buttons, and the function(s) enabled by the function electric circuit(s) connected with each of the at least four press buttons 103 will be illustrated. In this case, the four press buttons are referred as the first, second, third and fourth press buttons, respectively, and the respective function(s) possibly defined by the four press buttons may comprise:

For example, when the first press button performs a touch control operation, the respective function of the function electric circuit(s) connected with the first press button may be: increasing the luminance of the light(s) in the room(s) (one or more); also, it may be configured that the longer the duration of touch control operation performed by the first press button is, the higher the adjusted light luminance will be.

Accordingly, when the second press button performs a touch control operation, the respective function of the function electric circuit(s) connected with the second press button may be: decreasing the luminance of the light(s) in the room(s) (one or more); also, it may be configured that the longer the duration of touch control operation performed by the second press button is, the lower the adjusted light luminance will be.

Accordingly, when both of the first and third press buttons perform the touch control operation at the same time, the respective function of the function electric circuit(s) connected with each of the first and third press buttons may be: opening the curtain(s) in the room(s) (one or more); also it may be configured that when the touch control operations of the first and third press buttons are stopped simultaneously, the respective function of the function electric circuit(s) connected with each of the first and third press buttons may be: stopping the opening of the curtain(s) in the room(s) (one or more); also it may be configured that if the third press button performs a touch control operation before the first press button then performs a touch control operation, with the time interval between the touch control operations performed by the two press buttons being not less than a preset threshold which may be 0.1 s for example, the respective function of the function electric circuit(s) connected with each of the first and third press buttons may be: closing the curtain(s) in the room(s) (one or more).

Accordingly, when both of the third and fourth press buttons perform the touch control operation at the same time, the respective function of the function electric circuit(s) connected with each of the third and fourth press buttons may be: enabling respective functions of the KNX device(s) connected to the KNX bus, such as cooling by air conditioning or moisture maintenance, for example.

In an embodiment, the function information output by the function electric circuit(s) should be identified by the controller 104. For example, for the value of a capacitor, the respective function may be determined according to the range where the output capacitor value falls.

Figure 3:
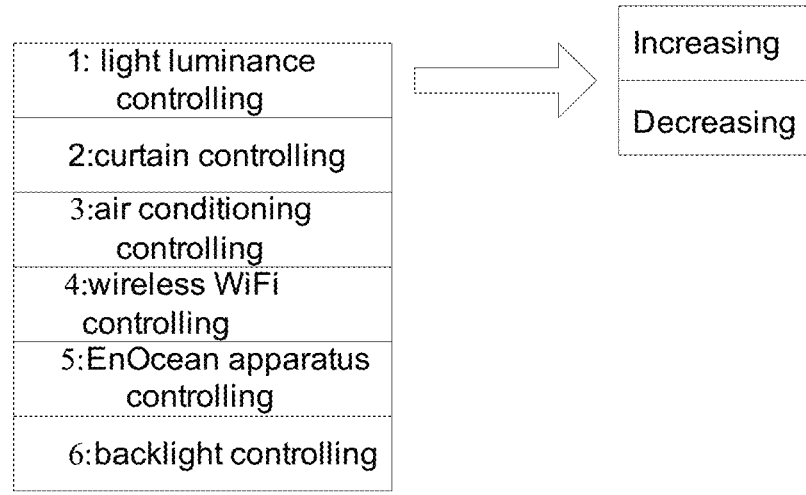
FIG. 3 is a schematic diagram of menu options displayed in a display screen according to an embodiment of the disclosure.

In a preferred embodiment of the disclosure, when the display screen 102 is in an open state, the controlling function of the control panel may be achieved in the following manner:

the display screen 102 is used for showing a plurality of menu options sent by the controller 105, wherein different menu options are used for achieving different functions; referring to FIG. 3, it shows the menu options displayed in the display screen wherein after each menu option is selected, the corresponding sub-menu option(s) may pop up. For example, the first menu option may be for luminance controlling of light and the corresponding sub-menu options may be Increasing and Decreasing.

Figure 4:
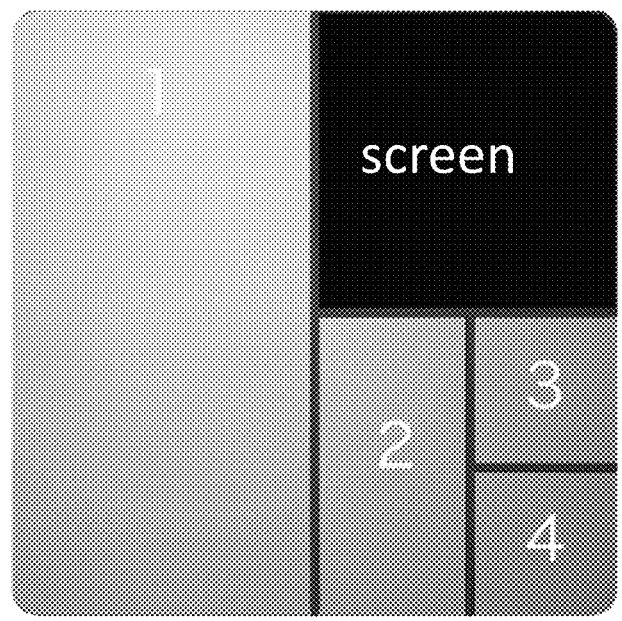
FIG. 4 is a schematic diagram illustrating the position relation of a display screen with four press buttons according to an embodiment of the disclosure.

The functions of Switching and Selecting of the menu options may be achieved by the press button(s) and the function electric circuit(s) connected therewith. Therefore, the control panel may comprise four press buttons and the position relation of the four press buttons and the display screen on the panel body may be illustrated in FIG. 4. The position relation of the four press buttons and the display screen on the panel body is not limited to the position relation as shown in FIG. 4, and the shape and arrangement of the four press buttons is not limited to those shown in FIG. 4.

A first function electric circuit, connected with a first press button of the four press buttons, may be used for outputting a Going-back function to the controller.

A second function electric circuit, connected with a second press button of the four press buttons, may be used for outputting a Selecting function to the controller.

A third function electric circuit, connected with a third press button of the four press buttons, may be used for outputting a Switching-up function to the controller.

A fourth function electric circuit, connected with a fourth press button of the four press buttons, may be used for outputting a Switching-down function to the controller.

The controller, connected with the display screen, may be further used for sending the plurality of menu options to the display screen and for achieving the Going-back, Switching and Selecting functions to the menu options in the display screen according to the function information output by the first, second, third and fourth function electric circuits.

For example, by means of the entering function of the second press button, the menu options as shown in FIG. 3 may be called out; and when the first menu option is selected by the cursor, the first menu option may be selected by the second press button, with the sub-menu options popping up: Increasing and Decreasing. By means of the fourth press button, the Switching-down function may be achieved to select the sub-menu option of Decreasing by the cursor. The second press button may be used to select the Decreasing function, and the fourth press button may be used to adjust the Decreasing function, thus achieving the Decreasing function for the light luminance.

Figure 5:
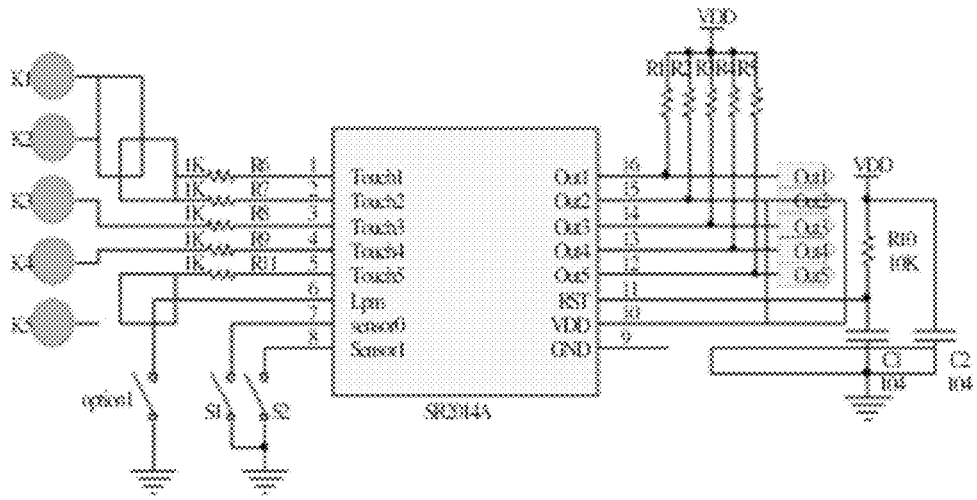
FIG. 5 is a schematic diagram of electric circuit connection of the press button(s), the output electric circuit(s) and the controller according to an embodiment of the disclosure.

In a preferred embodiment of the disclosure, the four function electric circuits connected with the four press buttons comprised in the control panel comprise: an SR2014A chip; each of the four press buttons is connected to a press button port of the SR2014A chip, and the press button port connected with the press button accordingly corresponds to a press button outlet connected with the controller. Referring to FIG. 5, it shows the connection relation of the electric circuit(s). The SR2014A chip may comprise five press button ports, and thus the remaining one press button port may be connected to ground or suspended.

In a preferred embodiment of the disclosure, in order to reduce any damage to the press button(s) performing the touch control operation(s), the press button(s) may comprise a touching type press button.

In order to make the purpose(s), technical solution(s) and advantage(s) clearer, a controlling method of the control panel according to the embodiment(s) of the disclosure will be further described in detail hereinafter with reference to the accompanying drawings and in combination with the specific embodiments.

Figure 6:
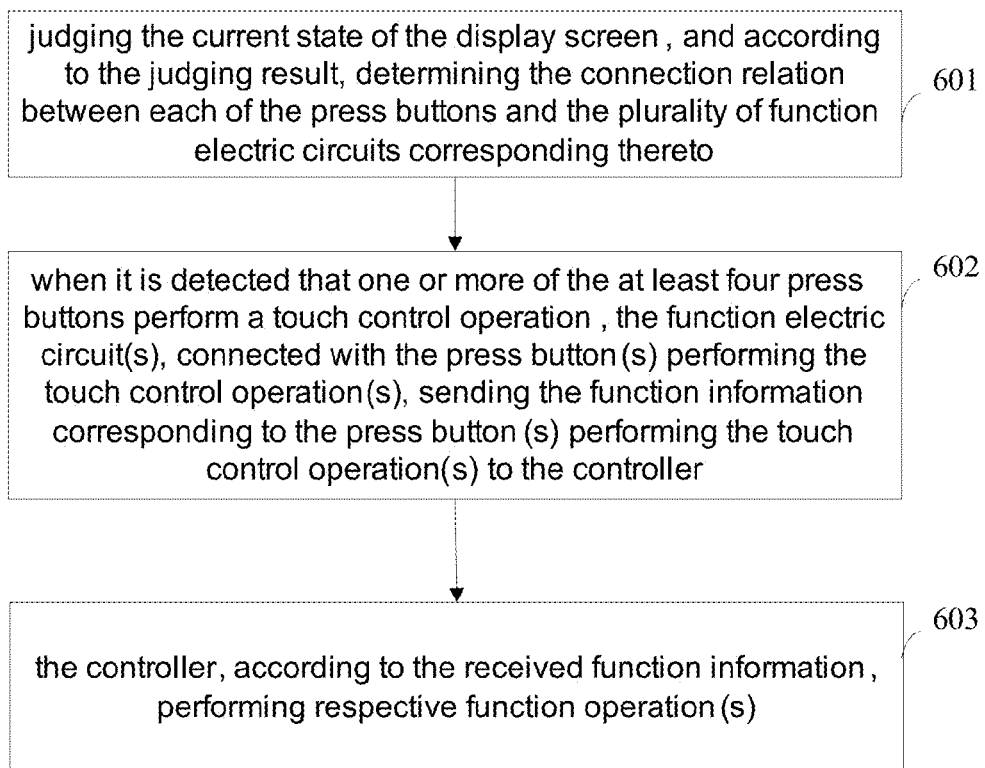
FIG. 6 is a schematic flowchart of a controlling method according to an embodiment of the disclosure.

As shown in FIG. 6, according to the embodiment(s) of the disclosure, a controlling method of the control panel according to the above embodiment(s) is provided which may comprise the following steps:

Step 601: judging the current state of the display screen, and according to the judging result, determining the connection relation between each of the press buttons and the plurality of function electric circuits corresponding thereto;

Step 602: when it is detected that one or more of the at least four press buttons perform a touch control operation, the function electric circuit(s), connected with the press button(s) performing the touch control operation(s), sending the function information corresponding to the press button(s) performing the touch control operation(s) to the controller; and Step 603: the controller, according to the received function information, performing respective function operation(s).

In a preferred embodiment of the disclosure, when the judging result shows that the display screen is in the closed state, the function information corresponding to the press button(s) performing the touch control operation(s) comprises: different functions corresponding to different touch control manners of one or more of the press buttons performing the touch control operations; wherein the touch control manners comprise one or more of a duration of a touch control operation of the press button, times of successive touch control operations of the press button, and a order of touch control operations of the press buttons.

In a preferred embodiment of the disclosure, when the judging result shows that the display screen is in the open state, the controlling method comprises: controlling the display screen, by the controller, to display a plurality of menu options, wherein different menu options are used for achieving different functions; and the function information corresponding to the press button(s) performing the touch control operation(s) comprises: a Going-back function, a Selecting function, a Switching-up function and a Switching-down function.

In summary, in the embodiment(s) of the disclosure, at least one of the beneficial effects can be achieved as follows:

1. In the embodiment(s) of the disclosure, it may be configured that at least four press buttons are provided on the panel body, wherein each of the press buttons corresponds to a plurality of function electric circuits, and the connection relation between each of the press buttons and the plurality of function electric circuits corresponding thereto is determined according to a state of the display screen. The function electric circuit(s) connected with at least one of the press buttons performing the touch control operation(s) may output respective function information to the controller such that the controller can perform the respective controlling operation(s). In the control panel, each press button may correspond to a plurality of function electric circuits and each function electric circuit may correspond to at least one of the press buttons. Therefore, if it is required to add function(s) of the control panel, more functions can be achieved by means of the at least four press buttons, without adding further press button(s) onto the panel body, thus decreasing the cost of the control panel.

2. In the embodiment(s) of the disclosure, different touch control functions may be achieved by different touch control manners of one or more press buttons wherein the touch control manners may comprise one or more of a duration of a touch control operation of the press button, times of successive touch control operations of the press button, and an order of touch control operations of the press buttons. Therefore, more functions can be achieved by relatively small number of press buttons.

3. In the embodiment(s) of the disclosure, by definition of function(s) for the press button(s) and in combination with the press button(s) and the menu options displayed in the display screen, the different menu options of Going-back, Switching and Selecting can be achieved, thus enable more functions with relatively small number of press buttons.

The information interaction between the units in the above apparatus and the performing processes thereof as well as other related contents belong to a general/same technical concept. Such contents can be specifically seen in the description of the embodiment(s) of method of the disclosure, and will not be repeated herein.

It should be noted that the terms of "first", "second", etc. are used herein only for distinguish one entity or operation from another entity or operation, rather than requiring or suggesting that there is a necessary actual relation or sequence between such entities or operations. Also, the terms of "comprise", "include" or any other variations thereof are used herein to cover the meaning of non-exclusive inclusion such that a process, a method, an article or a device including a plurality of factors will include these factors, and may further include other factor(s) not specified, or the factor(s) inherent to such process, method, article or device. For a factor defined by the clause of "comprising a/an", the process, method, article or device including such factor may further include another same factor, unless there is a further definition thereto.

It is understandable to those skilled in the art that all or some of the steps for achieving the above method embodiment(s) may be achieved by the hardware associated with the program instructions. The above program may be stored in the computer readable storing media and when the program is performed, the step(s) of the above method embodiment(s) may be performed. The above storing media may comprise ROM, RAM, disc, or CD, or various media which can be used to store program codes.

Finally, it should be noted that the above description is provided only for illustrating the preferred embodiment(s) of the disclosure and only for explaining the technical solution(s) of the disclosure, but not for limiting the protection scope of the disclosure. Any modification, equivalent substitution or improvement based on the spirit and principle of the disclosure will fall in the protection scope of the disclosure.

The invention claimed is:

1. A control panel, comprising:
 a panel body;
 a display screen provided on the panel body;
 at least four press buttons provided on the panel body, each of the press buttons correspondingly connects to a plurality of function electric circuits, and the connection relation between each of the press buttons and the plurality of function electric circuits corresponding thereto is determined according to a state of the display screen; wherein, the state of the display screen comprises a closed state and an open state;

the function electric circuits, each correspondingly connecting to at least one of the press buttons, configured to output respective function information to a controller when at least one of the press buttons connected performs a touch control operation; and the controller connected with the plurality of function electric circuits and configured to perform respective function operation(s) according to the received function information, wherein when the display screen is in an open state, the display screen is used for showing a plurality of menu options sent by the controller, wherein different menu options are used for achieving different functions;

the control panel comprises four press buttons, wherein a first function electric circuit, connected with a first press button of the four press buttons, is used for outputting a Going-back function to the controller;

a second function electric circuit, connected with a second press button of the four press buttons, is used for outputting a Selecting function to the controller;

a third function electric circuit, connected with a third press button of the four press buttons, is used for outputting a Switching-up function to the controller;

a fourth function electric circuit, connected with a fourth press button of the four press buttons, is used for outputting a Switching-down function to the controller; and the controller, connected with the display screen, is further used for sending the plurality of menu options to the display screen and for achieving the Going-back, Switching and Selecting functions to the menu options in the display screen according to the function information output by the first, second, third and fourth function electric circuits;

wherein, the four function electric circuits connected with the four press buttons comprised in the control panel comprise: an SR2014A chip; each of the four press buttons is connected to a press button port of the SR2014A chip, and the press button port connected with the press button accordingly corresponds to a press button outlet connected with the controller.

2. The control panel according to claim 1, wherein when the display screen is in a closed state, the connection relation of each of the press buttons comprises the function electric circuit(s) in connection corresponding thereto, for outputting different function(s) according to different touch control manners of one or more of the press buttons connected with the function electric circuit(s); wherein the touch control manners comprise one or more of a duration of a touch control operation of the press button, times of successive touch control operations of the press button, and an order of touch control operations of the press buttons.

3. The control panel according to claim 1, wherein each of the press buttons comprises a touching type press button.

4. A controlling method of the control panel according to claim 1, 2, or 3 comprising: judging the current state of the display screen, and according to the judging result, determining the connection relation between each of the press buttons and the plurality of function electric circuits corresponding thereto; when it is detected that one or more of the at least four press buttons perform a touch control operation, the function electric circuit(s), connected with the press button(s) performing the touch control operation(s), sending the function information corresponding to the press button(s) performing the touch control operation(s) to the controller; and the controller, according to the received function information, performing respective function operation(s).

5. The controlling method according to claim 4, wherein when the judging result shows that the display screen is in the closed state, the function information corresponding to the press button(s) performing the touch control operation(s) comprises: different functions corresponding to different touch control manners of one or more of the press buttons performing the touch control operations; wherein the touch control manners comprise one or more of a duration of a touch control operation of the press button, times of successive touch control operations of the press button, and an order of touch control operations of the press buttons.

6. The controlling method according to claim 4, wherein when the judging result shows that the display screen is in the open state, the controlling method comprises: controlling the display screen, by the controller, to display a plurality of menu options, wherein different menu options are used for achieving different functions; and the function information corresponding to the press button(s) performing the touch control operation(s) comprises: a Going-back function, a Selecting function, a Switching-up function and a Switching-down function.

* * * * *